(12) United States Patent
Thompson et al.

(10) Patent No.: US 8,013,466 B1
(45) Date of Patent: Sep. 6, 2011

(54) POE POWER TAPPING DEVICE AND METHOD OF USE

(75) Inventors: Scott D. Thompson, State College, PA (US); David E. Young, Pennsylvania Furnace, PA (US)

(73) Assignee: Oberon, Inc., State College, PA (US)

( * ) Notice: Subject to any disclaimer, the term of this patent is extended or adjusted under 35 U.S.C. 154(b) by 337 days.

(21) Appl. No.: 12/372,792

(22) Filed: Feb. 18, 2009

Related U.S. Application Data (60) Provisional application No. 61/029,868, filed on Feb. 19, 2008.

(51) Int. Cl.
 *H02J 1/00* (2006.01)
(52) U.S. Cl. .......................... 307/1; 713/300
(58) Field of Classification Search ......... 307/1, DIG. 1; 370/200; 713/300; 700/286; 333/177; 714/43; 455/402

See application file for complete search history.

(56) References Cited

U.S. PATENT DOCUMENTS

2008/0074906 A1 * 3/2008 Tsai et al. ............... 363/21.01
* cited by examiner

*Primary Examiner* — Jared J Fureman
*Assistant Examiner* — Daniel Cavallari
(74) *Attorney, Agent, or Firm* — John J. Elnitski, Jr.

(57) ABSTRACT

A POE tapping device for extracting power from a data cable. The POE tapping device includes an input connector, an output connector, a flow through connection, a bridge circuit, and a remote accessory connector. The flow through connection is between the input connector and the output connector, such that there is a direct feed from the first data cable to the second data cable. The bridge circuit is connected to the flow through connection to tap electrical current from the flow through connection, where the bridge circuit has a positive output and negative output to provide electrical current. The remote accessory connector is to be connected to a remote accessory, where the remote accessory connector is connected to the positive output and the negative output of the bridge circuit to receive electrical current from the bridge circuit that was tapped from the flow through connection.

21 Claims, 9 Drawing Sheets

POE POWER TAPPING DEVICE AND METHOD OF USE

This application claims the benefit of and incorporates by reference U.S. Provisional Application No. 61/029,868 filed Feb. 19, 2008.

BACKGROUND

The present invention generally relates to powering electrical devices using data cabling. More specifically, the present invention relates to extracting electrical power from data cabling.

Power Over Ethernet (POE) is a means for powering network connected devices known as Powered Devices (PDs) that are remotely located. The PDs are powered through a low voltage data cable, without the need for a line from an AC power source to each PD. In most cases, a standard eight wire Ethernet cable transports the power over two or all four wire pairs. In order to avoid damaging connected devices, Power Sourcing Equipment (PSE) applies a limited detection voltage to the PD. If the PD is designed to be powered by POE, the PD will present a signature load to the PSE. Upon detecting the signature load, the PSE will increase power sourcing until power is available to match the power class of the PD. If there is not a signature load, the PSE will not send power to the PD.

Traditionally, network connected devices such as PCs, laptops, IP phones, wireless LAN access points, net cameras, etc. have required both a data connection and an AC line power connection. Given the increasing number of network connected devices, the AC line power, generally installed by an electrician to code standards, is an expensive component of the overall system deployment. POE eliminates the need for additional AC power outlets and labor costs associated with installation, by sourcing the power in the network core, and distributing it over the data cable. Another advantage of POE is that it supports a point to multi-point power distribution architecture, carried over the existing data network. This lets network managers use a single Uninterrupted Power Source (UPS) at the network core to back-up power to multiple devices connected to the Local Area Network (LAN).

The Institute for Electrical and Electronic Engineers (IEEE) has standards (IEEE 802.3af and 802.3 at) that define PSE and PD design, such that products from different manufacturers are interoperable. Herein, the term POE shall encompass both standards compliant (802.3af and 802.3 at) and non-standard methods of using a POE. IEEE802.3af POE standards prescribe delivery of nominally 48 Vdc over two unshielded twisted pairs of standard data cabling. New, higher power IEEE 802.3 at standards for the POE and POE Plus specify that power is carried on all 4 wire pairs. The POE works over existing data cable including category 3, 4, 5e, or 6 data cables; horizontal and patch cables, patch panels, outlets and connecting hardware, without modification. Specifications for standard POE specify that a minimum 320 milliamps at 48 V (15.4 W) is sourced by the PSE. Due to the resistive loss on a 95m Ethernet data cable, the total minimum amount of continuous power that can be delivered to each node is specified as 12.95 W. Usually, the POE system is tolerant of a 2.45 W of power lost in the data cable. IEEE 802.3 at and POE Plus define a method to supply about 30 W to the PD using about 720 mA of current on each conductor of the data cabling.

The PSE contains a sensing mechanism to prevent sending power to non-standard compliant equipment. Only PDs that present an authentic POE signature to the PSE will receive power, preventing damage to non-standard compliant equipment. There are two types of PSE. The first is an End-Span switch and the second is known as mid-span panels. An end-span switch refers to an Ethernet switch with built-in POE capability. The end-span switches deliver data and power over the same two wiring data pairs of pairs 1/2 and 3/6. Mid-span panels resemble patch panels. The mid-span panels are placed between the PD and the Ethernet switches which do not have POE capability. The Mid-span panel receives the data alone in an RJ-45 input connector and delivers the data plus power in an RJ-45 output connector. The mid-span panel uses the two unused wiring pairs of pairs 4/5 and 7/8 to carry the power, while data runs on the data pair. Both End-span and Mid-span equipment deliver power and data directly to the PD and the PD can be conveniently placed at the point of use. For IP Phones, desktop PCs, and laptop PCs, the point of use is desktops throughput the workplace. For wireless access points and IP cameras, the point of use is ceilings and walls throughout the facility. For network connected industrial automation devices, the point of use may be throughput the factory or warehouse.

Current POE systems do not have provisions by POE to power other accessories, such as amplifiers, detectors, sensors, transducers, electronics, cameras, switches or wireless devices, which may be beneficially co-located with the PD that is powered by the POE system. Nor is there a convenient method of connecting these accessory devices, which may have a data output, to the network core. An example would be use of remote accessories such as a heat sensor, air quality sensor, sound sensor, or wireless transceiver co-located in the ceiling with a PD such as a wireless access point. Although the wireless access point PD is network connected and powered via POE, the co-located sensor will still require an AC line power connection and an additional data connection to the network core. Another example is Ethernet network used in industrial automation. POE enables automation equipment PDs to be powered by the data cable, but accessories co-located with the automation equipment PD, such as pressure and temperature transducers, are not connected to the POE power, nor connected to the POE to transmit their data on the network.

Another drawback to current POE systems is that POE and PDs may be sensitive to damaging voltage surges on the data cable. These power surges may be caused by lightning, short circuits, device failure, or inappropriately applied voltage. Network wide power surges could damage many PDs connected to the network. Most network connected equipment is inadequately protected from common mode and differential mode surges on the data cables. Existing Ethernet surge protection products preclude the use of POE, as they have the effect of shorting the DC power provided by the POE.

It is an object of the present invention to provide a device and method of use to extract power traveling to a PD to power remote accessories.

SUMMARY OF THE INVENTION

A POE tapping device for extracting power from a data cable. The POE tapping device includes an input connector, an output connector, a flow through connection, a bridge circuit, and a remote accessory connector. The flow through connection is between the input connector and the output connector, such that there is a direct feed from the first data cable to the second data cable. The bridge circuit is connected to the flow through connection to tap electrical current from the flow through connection, where the bridge circuit has a positive output and negative output to provide electrical current. The remote accessory connector is to be connected to a remote accessory, where the remote accessory connector is connected to the positive output and the negative output of the bridge circuit to receive electrical current from the bridge circuit that was tapped from the flow through connection.

DETAILED DESCRIPTION

The present invention is a POE power tapping device and method of use. The POE power tapping device provides for the extraction of a small amount of power from the POE system for remote accessories without interfering with the ability of the PSE to successfully detect and power the intended PD. The POE power tapping device is a circuit that is placed between the PSE and the PD. The POE power tapping device extracts a portion of power from the powered lines of the data cable, and delivers the extracted power to low power remote accessories that are co-located with the PD. The Ethernet cable is one example of a data cable and is the most commonly used in networking. This has minimal impact on the power delivered to the PD and in essence appears to be cable loss to the PSE. The low power remote accessories may be amplifiers, sensors, detectors, transducers, wireless devices, controllers, switches, electronics, cameras, etc. The method of use of the POE power tapping device permits a portion of the power delivered to the PD to be extracted from the POE system near the PD, without degrading the functions of detecting and powering the PD by the PSE.

The POE power tapping device may also include a serial data connector coupled to the unused conductor pairs of the data cable, so that the remote accessory can communicate data or analog waveforms over the existing the data cable. This data or analog waveform may be extracted from the data cable at a patch panel elsewhere on the network. The POE power tapping device also provides common mode and differential mode surge suppression across data cable wire conductors, to protect the PSE, PD, POE power tapping device and tap powered accessories. The surge protection system of the present invention provides protection from electrical surges on the data cable caused by lightning and other sources without impeding the passing of POE DC power and data to the PD. The POE power tapping device may also include an integrated wireless controller that is powered by the POE Power tapping device. The wireless controller enables the POE power tapping device to be remotely monitored and managed. Information about current and power usage, or signal coupled from the data or analog waveforms may be transmitted wirelessly from the integrated wireless controller. The wireless controller can also be used to receive wireless commands to turn on/turn-off powered accessories, PD or otherwise control connected accessories.

Figure 1:
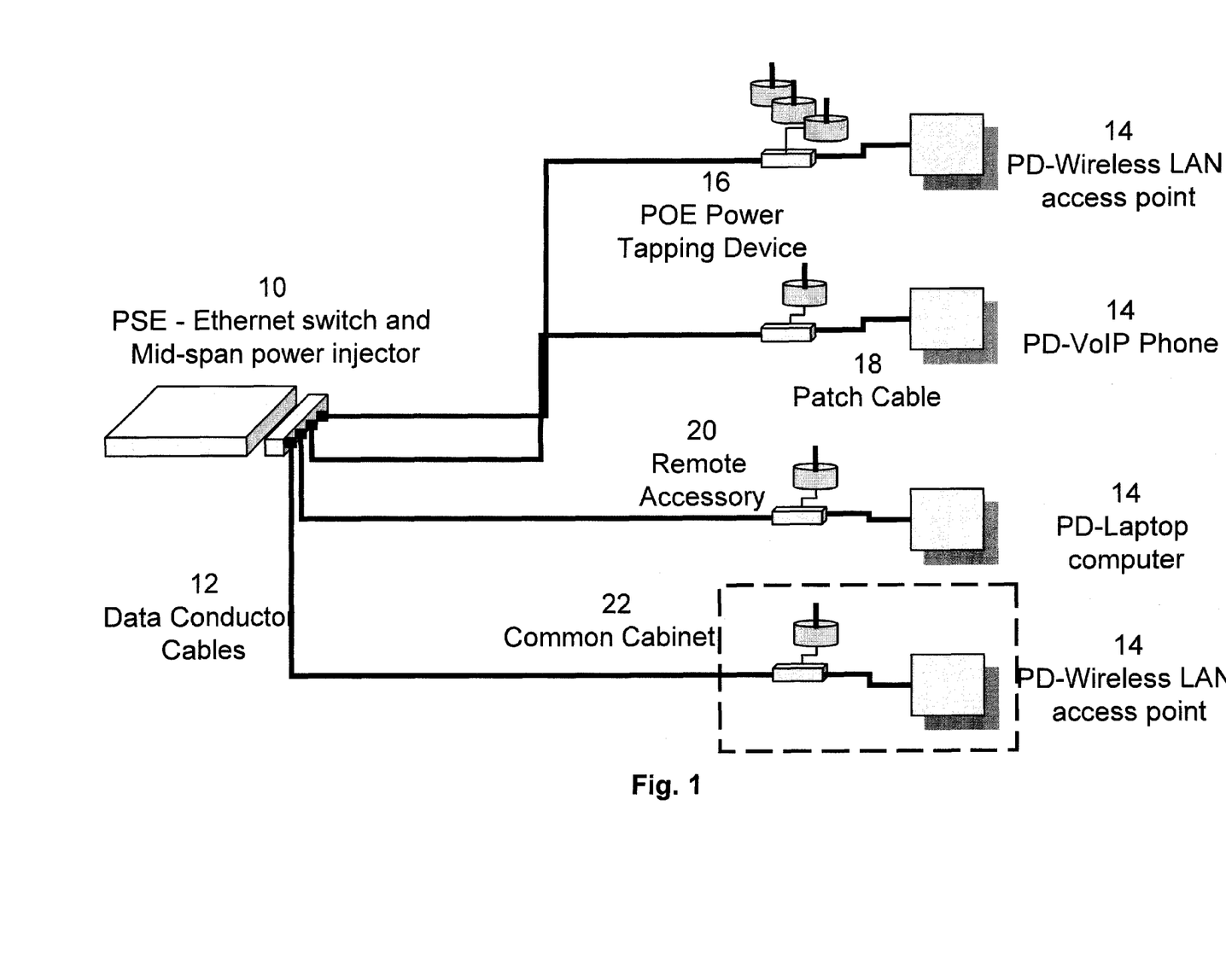
FIG. 1 is a schematic view of a POE power tapping device used in a network according to the present invention.

FIG. 1 shows an example of an implementation of the POE power tapping device with a network in a building. The PSE 10 shown includes an Ethernet switch and a mid span power injector. The PSE 10 could also be an end-span Ethernet switch. Data and power is provided and conducted through the building on two or four of the wire conductor pairs of each Ethernet cable 12. FIG. 1 shows PDs 14 at certain locations throughout the building, including wireless LAN access points, laptop computers, surveillance cameras and VoIP phones. Power and data is supplied to the PD 14 through the POE Power tapping device 16 and a patch cable 18. A small amount of power is extracted from the data cable 12 by the POE power tapping device 16. This power is supplied to remote accessories 20 by a short power cable. In many cases, it may be desirable to co-locate the PD 14 with the remote accessory 20 inside a cabinet 22, as shown in FIG. 1.

Figure 2:
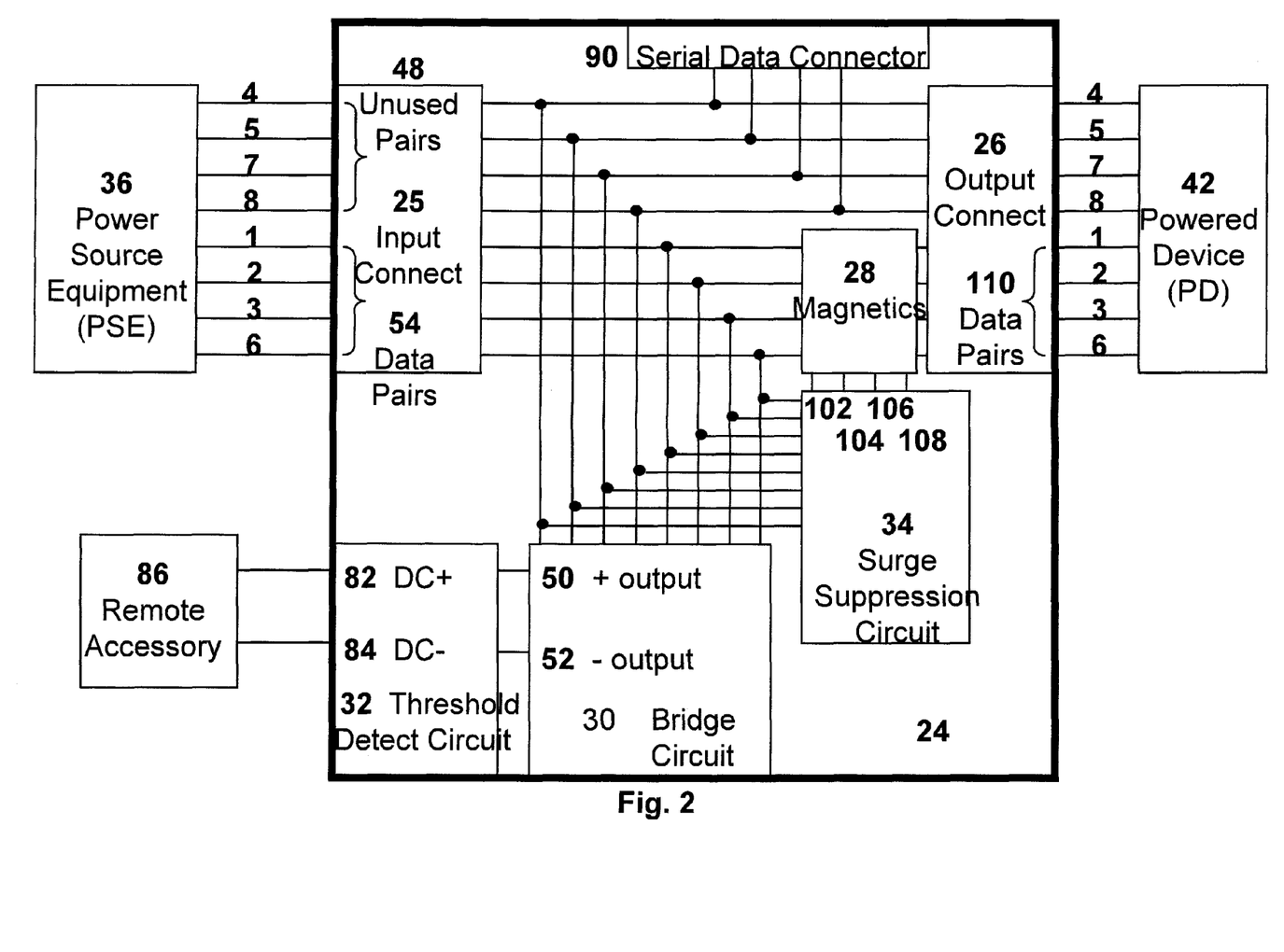
FIG. 2 is a schematic view of a POE power tapping device according to the present invention.

A basic POE power tapping device 24 is shown in FIG. 2. The POE power tapping device 24 includes an input connector 25, output connector 26, magnetics circuit 28, bridge circuit 30, threshold detect circuit 32, and surge suppression circuit 34. The POE power tapping device 24 is connected to the PSE 36 using a standard eight wire conductor data cable 38. The eight wire conductors are in four pairs. The POE power tapping device 24 provides for the unused pairs 4, 5, 7, and 8 to pass directly through to the output connector 26, as shown in FIG. 2. In a mid-span implementation, lines 4 and 7 carry the positive voltage, and lines 5 and 8 carry the negative voltage. The data pairs 1, 2, 3 and 6 are nominally connected to the output connector 26 through the magnetics circuit 28 to carry transmit data and receive data. In an end-span implementation, lines 1 and 2 carry the positive voltage, and lines 3 and 6 carry the negative voltage. The voltage in the end-span implementation is referred to as phantom voltage, because there is no DC voltage differential across a pair, only between pairs 1/2 and 3/6. The POE power tapping device 24 can be plugged into the PSE 36 using a data cable 38. Since the POE power tapping device 24 does not provide the proper signature load to the PSE 36, the PSE 36 does not deliver power to the POE power tapping device 24. When a PD 42 is connected to the POE power tapping device 24 at the output connector 26 using a patch data cable 39, the PSE 36 now senses the connection, through the POE power tapping device 24, by means of a low voltage sensing waveform. The voltage is low enough not to damage non-POE PDs, which may be inadvertently connected. If the PSE 36 senses the signature POE load, which is 25 k ohms, the PSE 36 begins ramping voltage up towards the nominal 48 Vdc POE rated level.

Figure 3:
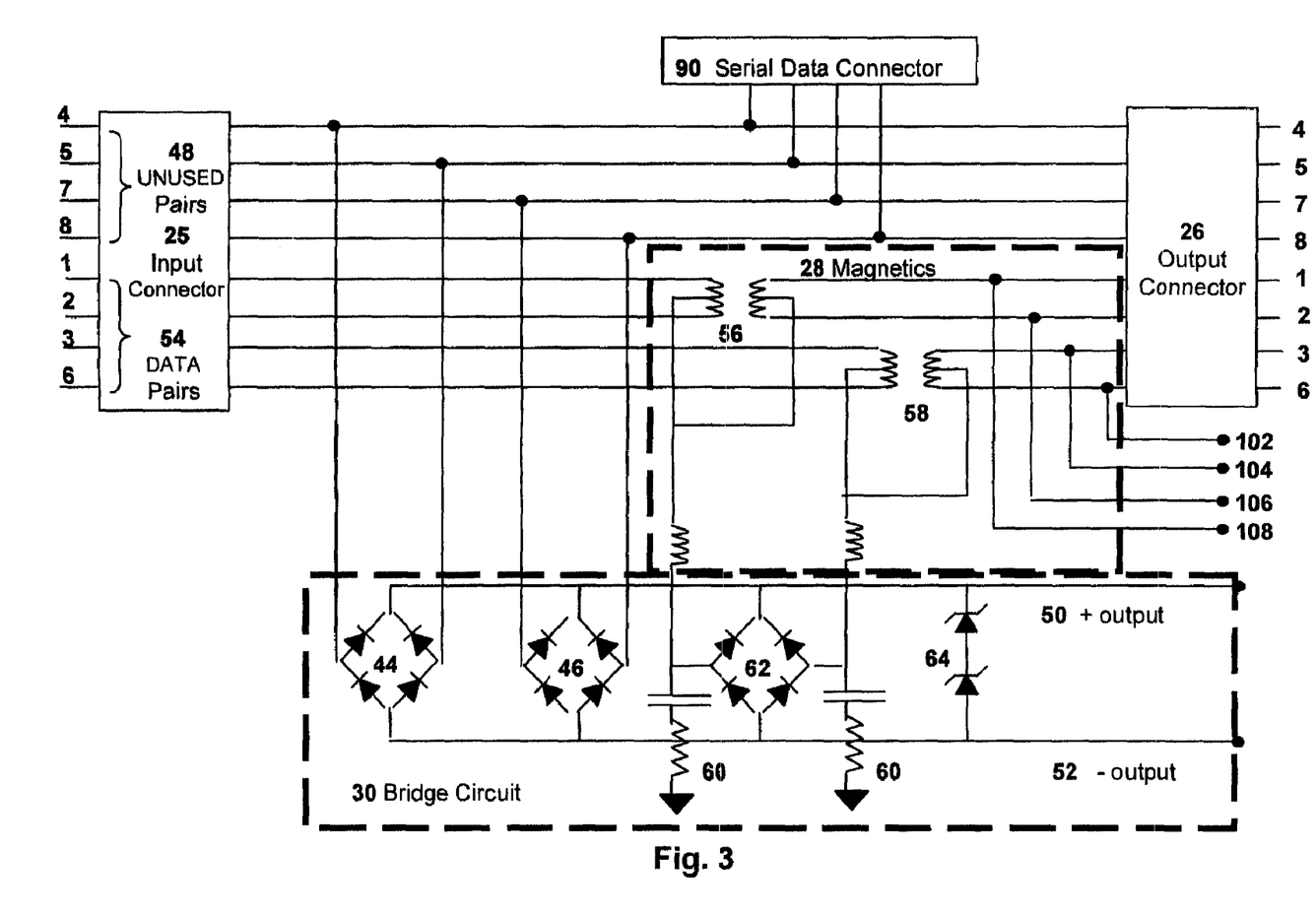
FIG. 3 is a schematic view of a bridge and magnetics circuits of the POE power tapping device according to the present invention.

Within the POE power tapping device 24 there is the magnetics circuit 28 and the bridge circuit 30, as shown in FIGS. 2-3. Magnetics is a term of art and used to refer to a type of coupling circuit. The bridge circuit 30 includes rectifying bridges 44, 46 connected directly to unused pairs 48. In a mid-span implementation where the unused pairs are used, the positive voltage of lines 4 and 7 are coupled to the positive input line 50 through rectifying bridges 44 and 46. The negative voltage of lines 5 and 8 is coupled to the negative input line 52, also through rectifying bridges 44 and 46. In the End-span configuration where power is provided over the data pairs 54, a way of tapping the DC voltage without affecting the data signal is required. Data on lines 1 and 2 are coupled to the output connector 26 by use of a center-tapped transformer 56. The positive DC voltage on lines 1 and 2 is center tapped at 56. Data on lines 3 and 6 are coupled to the output connector 26 by use of a second center tapped transformer 58. The negative voltage on lines 3 and 6 is center tapped at 58. The center tapped positive voltage and center tapped negative voltage are fused and connected to a R-C network 60 to provide a limited slew rate and then the center tapped positive voltage and center tapped negative voltage is delivered to rectifying bridge 62 to couple the positive voltage to positive input 50 and the negative voltage to negative input 52. The limited slew rate provides for a ramping up of voltage, instead of instantly applying the voltage. A clamping circuit defined by zener diodes 64 is designed to prevent over-voltage on 50 and 52. The center tapped DC power is also re-applied to the center tap on the output connector side 26 of the transformers 56, 58 to pass DC voltage through to the PD 42. Thus, for both mid-span and end-span implementations, the POE power tapping device 24 passes the voltage sourced by the PSE 36 to the positive input 50 and the negative input 52 of the bridge circuit.

Figure 4:
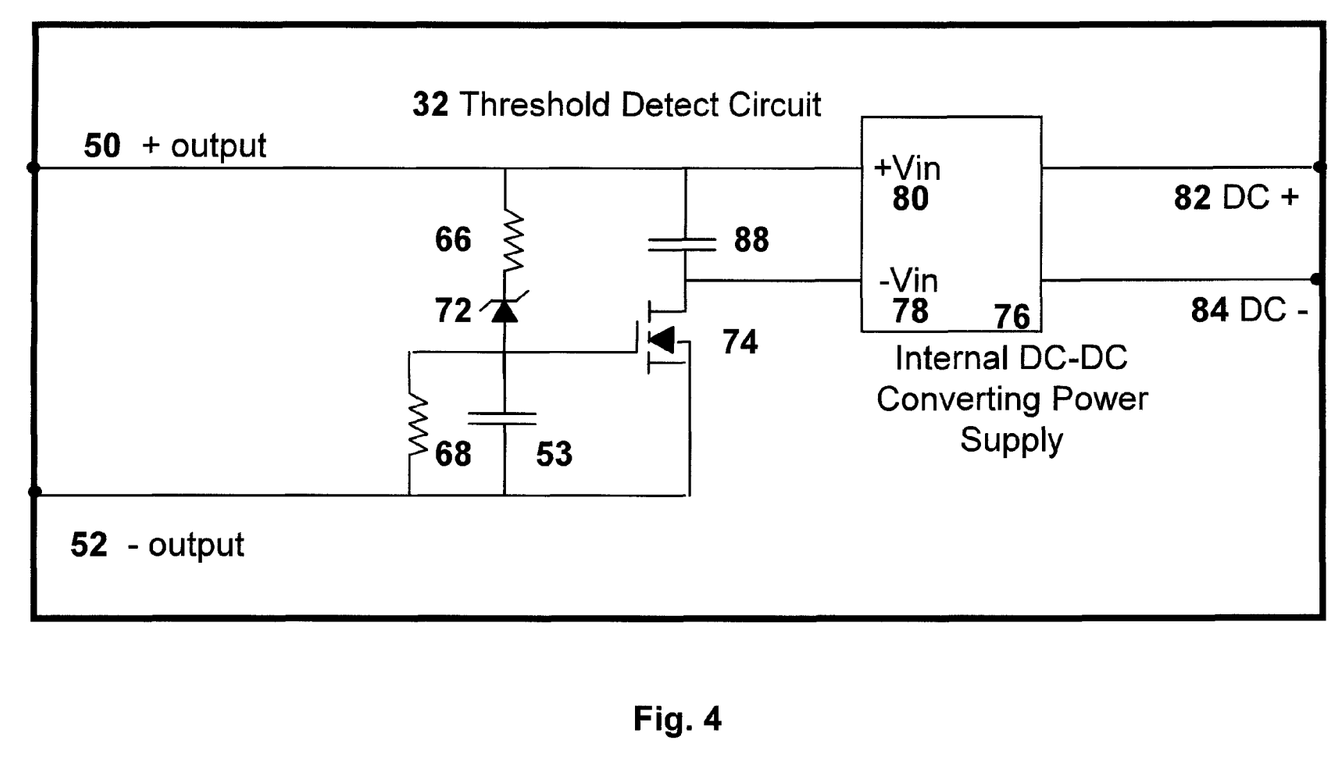
FIG. 4 is a schematic view of a threshold detect circuit of the POE power tapping device according to the present invention.

The threshold detect circuit 32 of FIGS. 2 and 4 includes a resistor-capacitor (R-C) network 66, 68, 70, a voltage threshold setting diode 72, a switching Field Effect Transistor (FET) 74 and an internal DC-DC converting power supply 76. The threshold detect circuit 32 is designed to receive the voltage across positive input 50 and negative input 52 from the bridge circuit 30. The switching FET 74 remains "OFF" until the voltage across positive input 50 and negative input 52 exceeds a threshold voltage determined by the threshold setting diode 72. While the Switching FET is in the "OFF" state, no voltage differential is delivered to the internal DC-DC converting power supply 76, and no current is drawn by the remote accessories. No current or power is drawn by the internal DC-DC converting power supply 76 or the POE power tapping device 24 while the bridge circuit 30 is delivering voltage to the threshold detect circuit 32, until the delivered voltage is greater than the threshold voltage.

When the POE power tapping device 24 is initially connected to the PSE 36 with no PD 42 connected, the sensing voltage generated by the PSE 36 is delivered by the bridge circuit 30 to positive input 50 and negative input 52. But this voltage is not above the threshold detect circuit's 32 threshold voltage and consequently no current or power is drawn. When a PD 42 is connected to the system through the POE power tapping device 24, the PSE 36 detects the PDs 42 signature load and begins to ramp up sourced voltage. This source voltage is delivered to positive input 50 and negative input 52. When the voltage across positive input 50 and negative input 52 delivered by the bridge circuit 30 exceeds the threshold voltage established by the zener diode 72, the switching FET 74 is turned on. This has the effect of connecting the negative voltage in terminal (−Vin) 78 of the internal DC-DC converting power supply 76 to negative input 52 and connecting the positive voltage in terminal (+Vin) 80 of the internal DC-DC converting power supply 76 to positive input 50. This connecting establishes a voltage differential across the input terminals (+Vin) 80 and (−Vin) 78 of the internal DC-DC converting power supply 76, equivalent to the voltage supplied by the PSE 32 to the bridge circuit 30. The internal DC-DC converting power supply 76 is now able to draw power from the bridge circuit 30, and consequently from the PSE 36. The effect is to extract power from the lines of the data cable 38. The internal DC-DC converting power supply 76 then converts the applied POE voltage to the desired voltage required by the remote accessories across DC+ 82 and DC− 84 to supply power to the remote accessories 86. The internal DC-DC converting power supply 76 usually is used to reduce the voltage. When the PSE 36 detects the PD 42 and begins to source full voltage, it is desirable to permit the full power to be applied to the PD 42 initially, before being applied to the remote accessories 86. In order to do this, the threshold detect circuit 32 includes a R-C Network 66, 68, 70 which provides a delay or time-out between the presence of full voltage across positive input 50 and negative input 52 and the zener diode 72, resistor 66 and capacitor 70. After the full voltage time-out time constant is exceeded, FET 74 turns on, allowing power to be delivered to the power supply 76. When full voltage is initially delivered across positive input 50 and negative input 52, there is an in-rush current. Load capacitor 88 must ramp up to the line voltage in a controlled manner without interfering with PSE 36 current limit. Load capacitor 88 prevents the internal DC-DC converting power supply 76 from reacting to intermittent sags in power from the bridge circuit 30.

Figure 5:
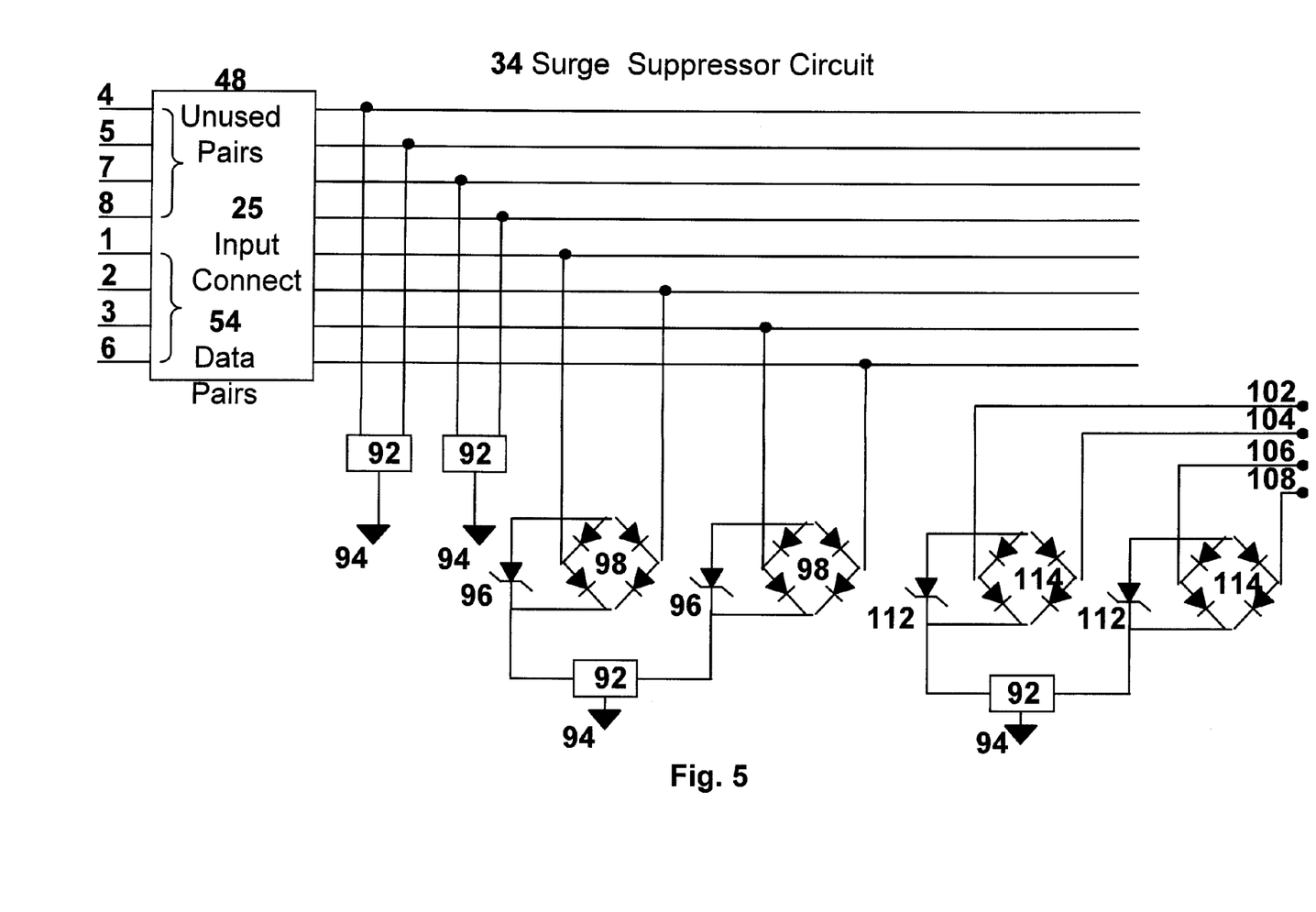
FIG. 5 is a schematic view of a surge suppresser circuit of the POE power tapping device according to the present invention.

FIG. 2 shows the optional serial data connector 90 connected to the unused pairs 48. Data or waveforms from remote accessories can be coupled to the unused pairs of the data cable 38 by the serial data connector 90. Since the POE power tapping device 24 is placed between the PD 42 and the data cable 38, it is an ideal location for an electrical surge and lightning suppression circuit, which passes both data and power over both data pairs and unused pairs. As shown in FIG. 5, for a Mid span implementation that uses unused conductor pairs 48, the pairs 4, 5 and 7, 8 are connected to an MOV (Metal Oxide Varistor) 92. The MOV is a semiconductor clamping device. This has the effect of clamping each conductor wire to 75 Vdc relative to ground 94 using the MOV device 92. This prevents an over-voltage on either pair from reaching the PD 42 from the PSE 36 side of the POE power tapping device 24. In an End span configuration data pairs 54 are clamped to 7.5 Vdc between conductors of the pairs 1, 2 and 3, 6 by the zener diode 96 through the rectifying bridge 98. This prevents destructive voltage across the conductors within a pair on the PSE 36 side of the POE power tapping device 24, from reaching the PD 42. The surge suppression circuit 100 of the POE power tapping device 24 also prevents surges generated on the PD 42 side of the POE power tapping device 24 from reaching the PSE 36. Lines 102, 104, 106 and 108 are connected to the data pairs 110 on the output connector 26 side shown in FIG. 2. The pairs are clamped to 7.5 Vdc between conductors of the pairs 1/2 and 3/6 by the zener diode 112 through the rectifying bridge 114. This prevents destructive voltage across the conductors within a pair from reaching the PSE 36. Each data pair 1/2 and 3/6 is also clamped to not exceed 75 Vdc relative to ground 94 by use of an MOV device 92 connected to the lines by rectifying bridge 114. This can help prevent common mode over-voltage or surge damage to both the PSE 36 and PD 42.

Figure 6:
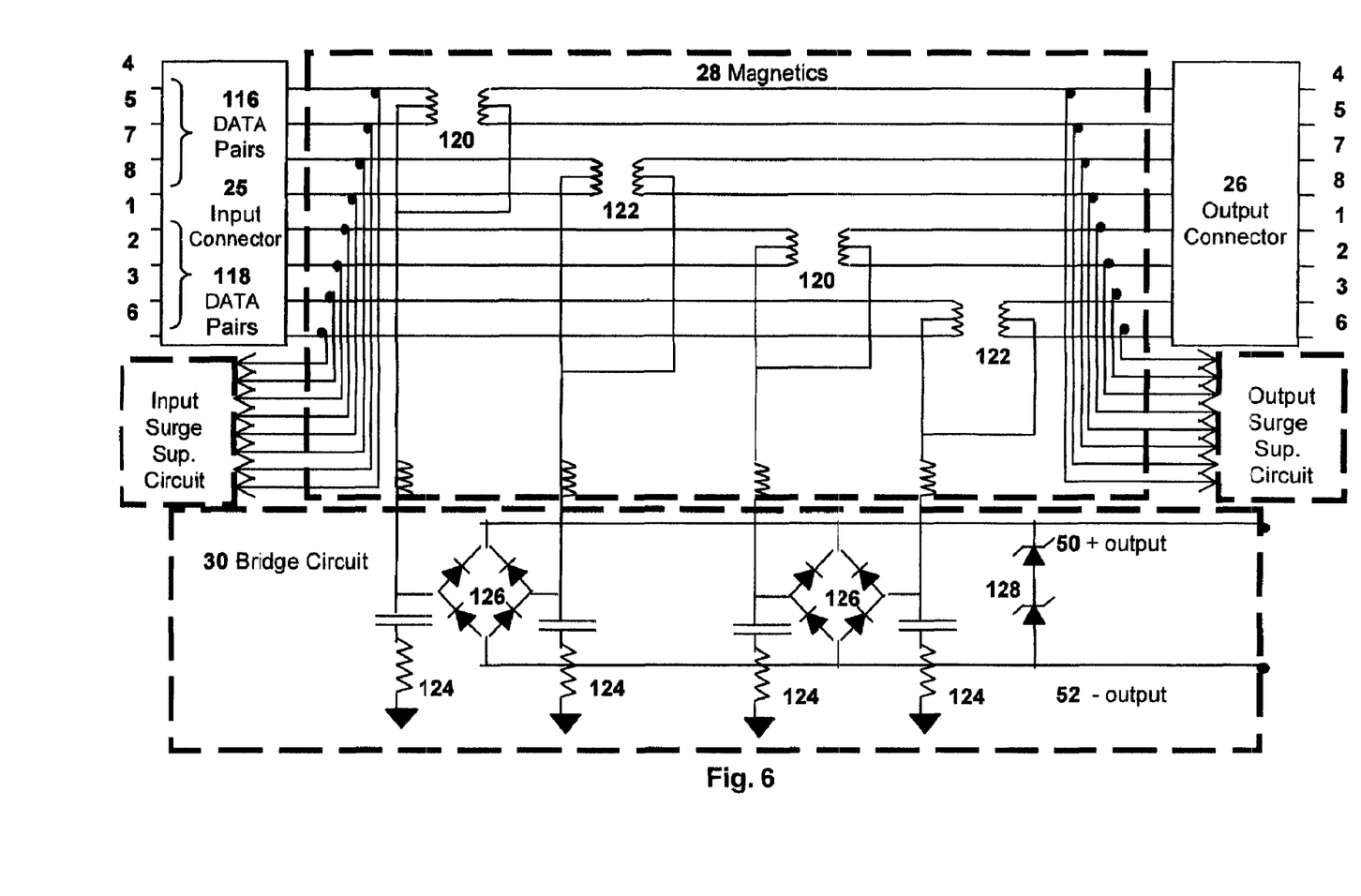
FIG. 6 is a schematic view of another bridge circuit and magnetics circuit of the POE power tapping device according to the present invention.

FIG. 6 schematically illustrates the bridge circuit 30 and magnetics circuit 28 for an embodiment of the POE power tapping device 24 using all four conductor pairs for power and/or data. For the embodiment of FIG. 6, where power and data may exist on all four conductor pairs 116 and 118, a method of extracting the DC voltage without affecting the data signal is required. Data on all of the conductors is coupled from the input connector 25 to the output connector 26 by means of center-tapped transformers 120 and 122. The positive DC voltage on lines 1, 2, 4, and 5 is center tapped at 120. The negative voltage on lines 3, 6, 7 and 8 is center tapped at 122. After the center taps 120, 122, the positive DC voltage on lines 1, 2, 4, 5 and the negative voltage on lines 3, 6, 7, 8 are fused and connected to a R-C network 124 to provide a limited slew rate and then the center tapped positive voltage and center tapped negative voltage is delivered to rectifying bridge 126 to couple the positive voltage to positive input 50 and the negative voltage to negative input 52. The center tapped positive voltage and center tapped negative voltage are fused and connected to a R-C network 124 to provide a limited slew rate and then the center tapped positive voltage and center tapped negative voltage is delivered to rectifying bridge 126 to couple the positive voltage to positive input 50 and the negative voltage to negative input 52. A clamping circuit defined by zener diodes 128 is designed to prevent over-voltage on positive input 50 and negative input 52. The center tapped DC power is also re-applied to the center tap on the output connector side of the transformers 120, 122 to pass DC voltage through to the PD 42. Thus, for both mid-span and end-span implementations, the POE power tapping device 24 passes the voltage sourced by the PSE 36 to positive input 50 and negative input 52. The threshold detect circuit for the embodiment of FIGS. 6-8 would be the same as the threshold detect circuit 32 shown in FIG. 4.

Figure 7:
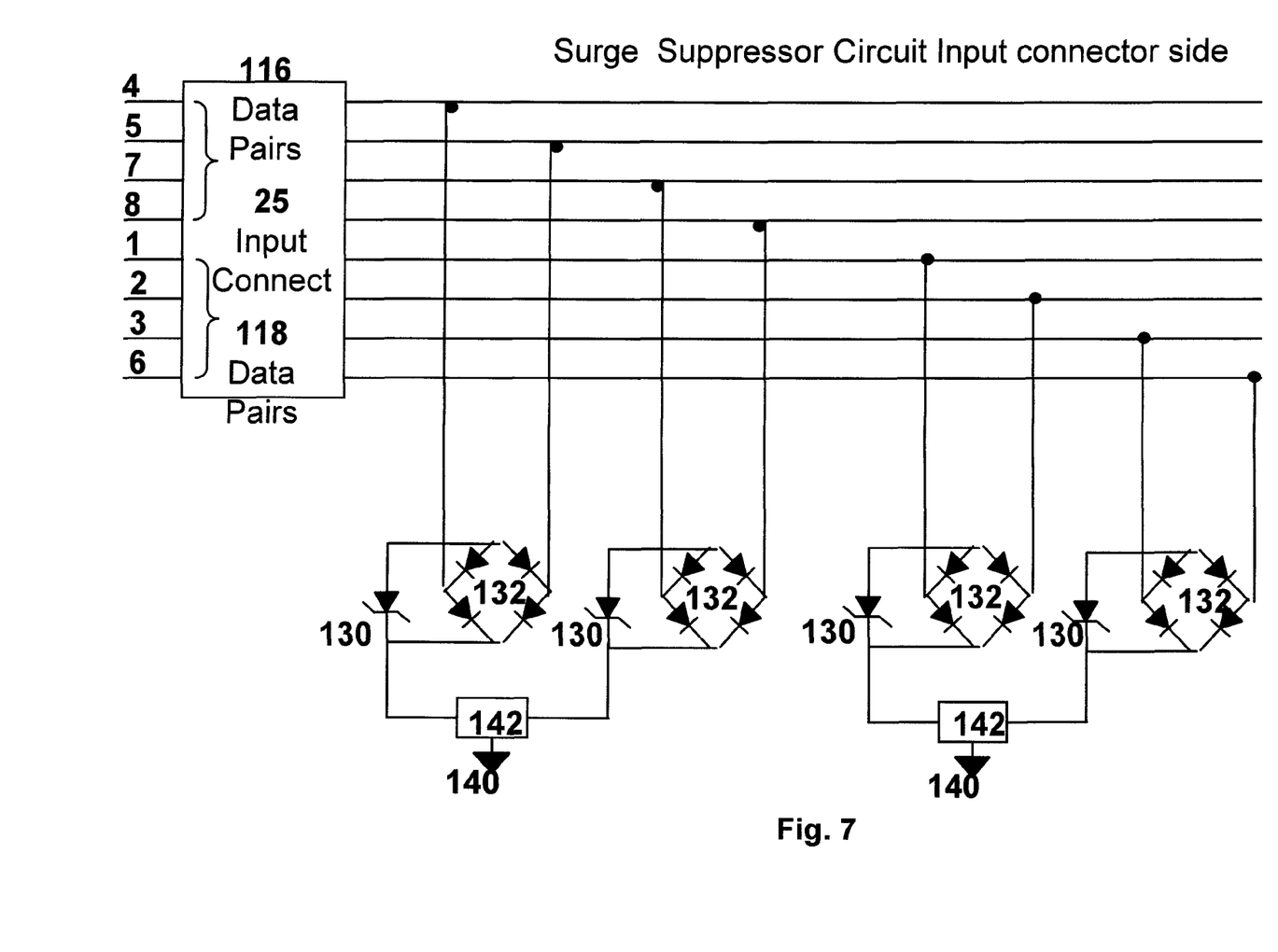
FIG. 7 is a schematic view of a surge suppresser circuit on an input side of the POE power tapping device according to the present invention.
Figure 8:
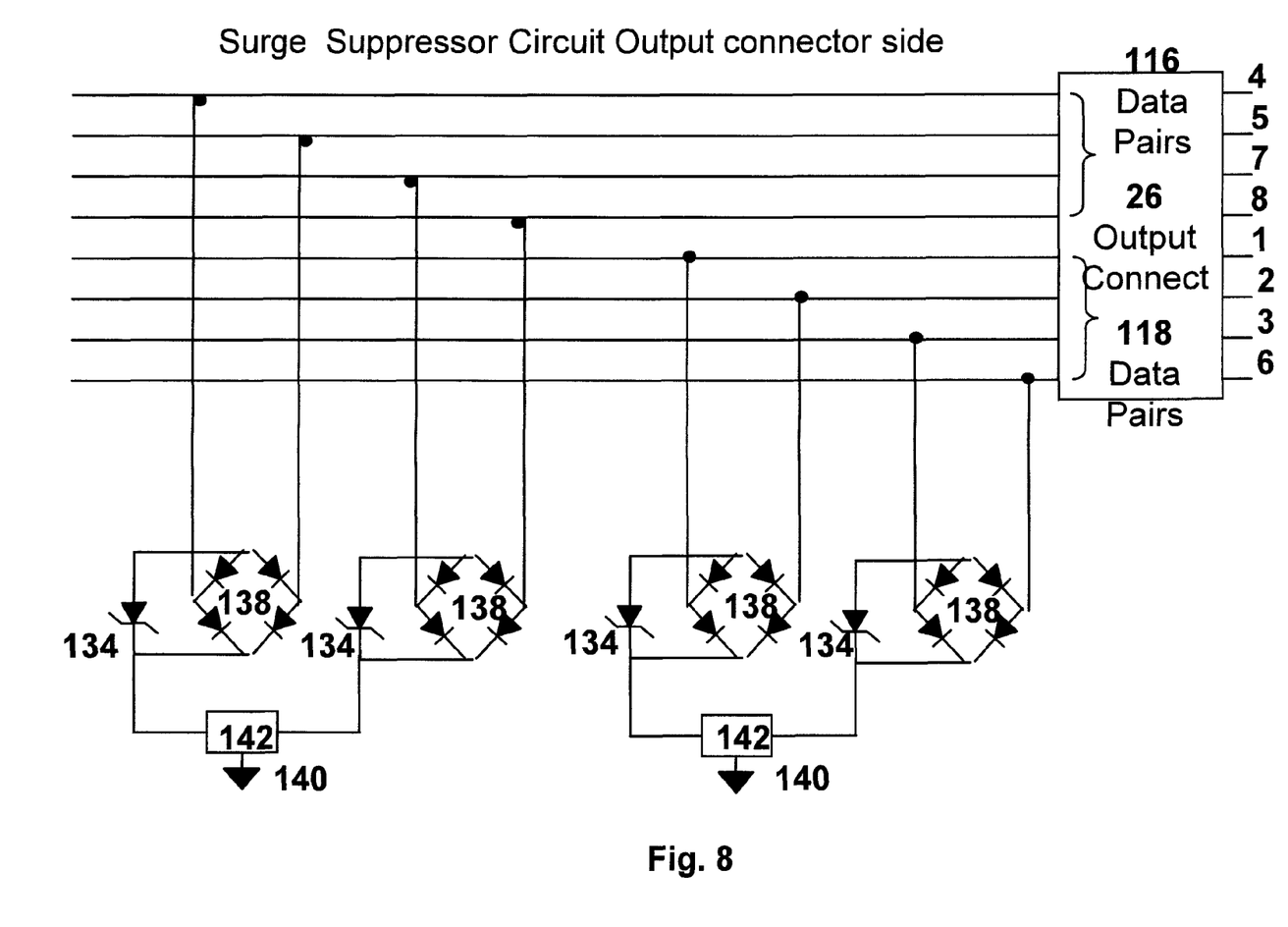
FIG. 8 is a schematic view of a surge suppresser circuit on an output side of the POE power tapping device according to the present invention.

FIG. 7 shows a surge suppressor circuit for the input connector side of POE power tapping device 24 using all four conductor pairs for power and/or data of FIG. 6. FIG. 7 shows the conductor pairs 1/2, 3/6, 4/5, and, 7/8 are clamped to 7.5 Vdc between conductors by the Zener diode 130 through the rectifying bridge 132 for the input connector 25. This prevents destructive voltage across the conductors within a pair on the PSE 36 side of the POE power tapping device 24, from reaching PD 42 side. FIG. 8 shows a surge suppressor circuit for the output connector 26 side of POE power tapping device 24 using all four conductor pairs for power and/or data. FIG. 8 shows the conductor pairs 1/2, 3/6, 4/5, and, 7/8 are clamped to 7.5 Vdc between conductors by the Zener diode 134 through the rectifying bridge 138 for the output connector 26. This prevents destructive voltage across the conductors within a pair on the PD 42 side of the POE power tapping device 24 from reaching the PSE 36 side. Every conductor pair 1/2, 3/6, 4/5, 7/8, is also clamped to not exceed 75 Vdc relative to ground 140 by use of an MOV device 142 connected to the lines by rectifying bridge 138. This can help prevent common mode over-voltage or surge damage to both the PSE 36 and PD 42, as shown in FIGS. 7-8.

The POE power tapping device may also be used to "key" or shut off power delivered to the PD, based on sensor inputs to the POE power tapping device. This can be used to save energy by reducing the amount of time network connected devices are powered. For instance, the POE power tapping device is used to power a detector such as a local sensor or device, such as light or sound detector, and associated logic. When the detector is triggered by activity, the detector sends a signal to the POE power tapping device that is capable of then keying power to the PD. An example of this would be to have a light sensor powered by the POE power tapping device and able to key the wireless access point off and on through the POE power tapping device. When lights are turned on in the room, the light detector in the POE power tapping device detects the light and enables power to be delivered to the wireless access point. When the lights are turned off, the light detector in the POE power tapping device detects this and shuts off power to the wireless access point. Another example would be to have a sound or motion sensor connected to the POE power tapping device. This sound or motion sensor could be used to trigger power delivery to a network connected PD such as a surveillance camera. When a sound or motion is detected, the triggering signal is delivered to the POE power tapping device, which is capable of keying power to the PD. After a period of time with no other sound or motion detection, the POE power tapping device could switch-off power to the PD. This type of power keying could be used to significantly reduce energy use by network connected devices.

Figure 9:
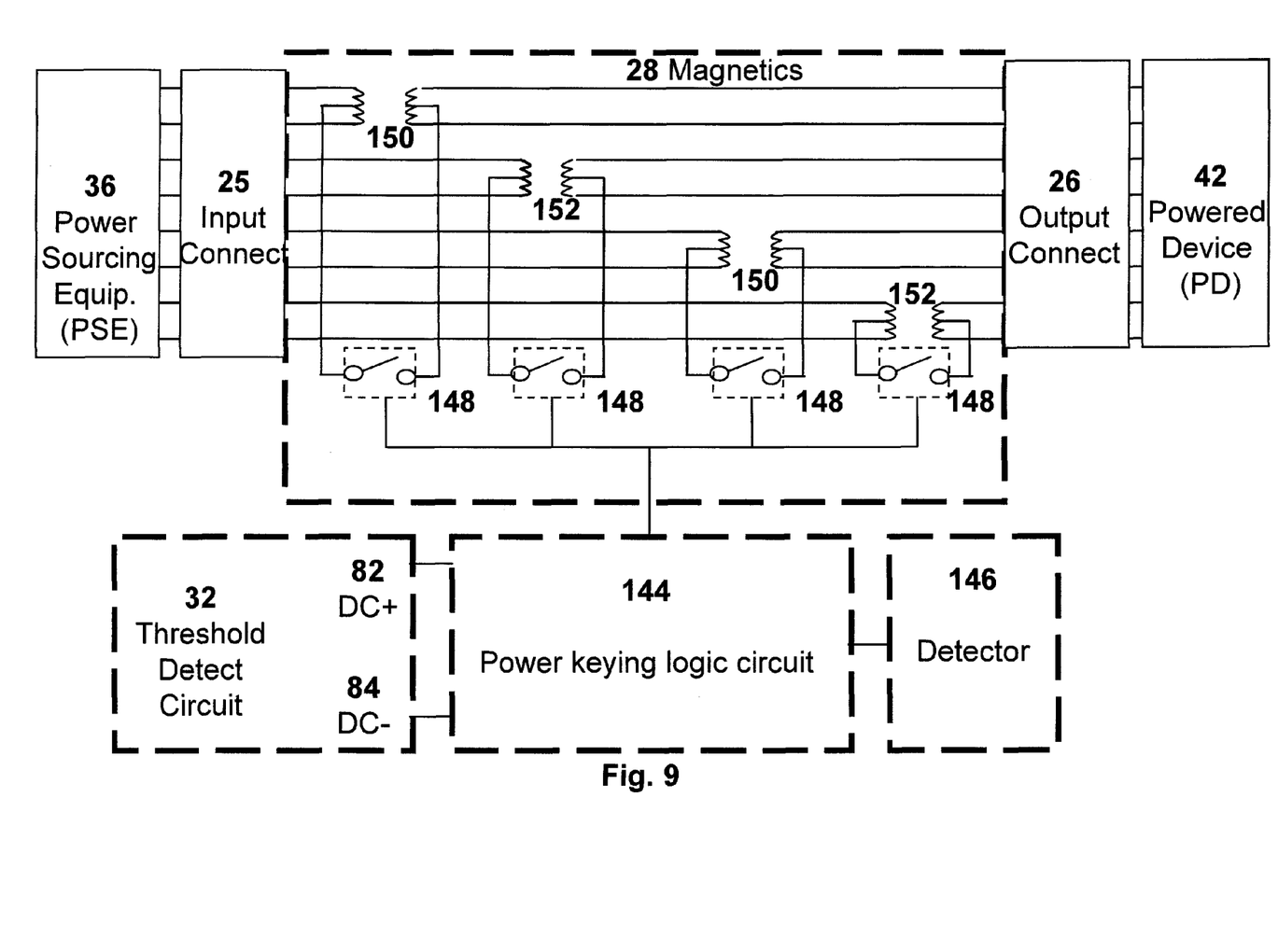
FIG. 9 is a schematic view of power keying using the POE power tapping device according to the present invention.

FIG. 9 shows an example of the implementation of using power keying with the POE power tapping device. As shown in FIG. 9, a PD Power Keying Function can be engaged which allows the POE power tapping device to control the delivery of power to the PD. A Power Keying Logic Circuit 144, receives an input from the Detector device 146. The Detector device 146 can be a light, heat, sound, air quality, temperature, wireless, or any other type of reception device which can indicate a change in environmental conditions. The Power Keying Logic Circuit 144 is powered by the Threshold Detect Circuit 32 of the POE power tapping device 24. The Power Keying Logic Circuit 144 uses the input from the Detector device 146 to determine whether power should be delivered to the PD 42. The Power Keying Logic circuit 144 controls a switch 148 in the conductor path between center taps of the magnetic couplers 150, 152. The switch 148 could also be between the unused pairs and the PD 42 for the configuration shown in FIG. 1. When the switch 148 is commanded open by the Power Keying Logic Circuit 144, current cannot flow from the PSE 36 to the PD 42. When the switch 148 is commanded closed by the Power Keying Logic Circuit 144, current will flow unimpeded from the PSE 36 to the PD 42. Therefore, the Power Keying Logic Circuit 144 is able to turn the PD 42 off, and on, based on inputs from the Detector 146. Because of the novel method this invention uses to extract some power out of the data cable, power delivery to the PD can be keyed off, while power is still delivered to the POE Tapping device and remote accessories.

While different embodiment of the invention have been described in detail herein, it will be appreciated by those skilled in the art that various modification and alternatives to embodiments could be developed in light of the overall teachings of the disclosure. Accordingly, the particular arrangements are illustrated only and are not limiting as to the scope of the invention that is to be given the full breadth of any and all equivalents thereof.

We claim:

1. A POE tapping device for extracting power from a data cable that supplies power to a power device, comprising:
   an input connector adapted to receive a connector from a first data cable that supplies power to the power device;
   an output connector adapted to receive a connector of a second data cable that is connected between said POE tapping device and the power device;
   a flow through connection between said input connector and said output connector such that there is a direct feed from the first data cable to the second data cable;
   a bridge circuit connected to said flow through connection to tap electrical current from said flow through connection that is flowing from at least one set of two conductors of the first data cable that carries positive and negative current to at least two conductors of the second data cable to receive the positive and negative current, said bridge circuit having a positive output and negative output to provide electrical current; and
   a remote accessory connector adapted to be connected to a remote accessory, said remote accessory connector connected to said positive output and said negative output of said bridge circuit to receive electrical current from said bridge circuit that was tapped from said flow through connection.

2. The POE tapping device of claim 1, wherein said bridge circuit includes a rectifying bridge for each set of the first data cable that carries positive and negative current and is to be tapped, each of said rectifying bridge connected to said positive output and said negative output of said bridge circuit to provide electrical current to said remote accessory connector.

3. The POE tapping device of claim 1, further including a power extraction data coupling circuit between said flow through connection and said bridge circuit, said power extraction data coupling circuit connected to said flow through connection to tap positive and negative electrical current from said flow through connection that is flowing from at least two conductors of the first data cable that also carry data to at least two conductors of the second data cable, said power extraction data coupling circuit able to extract a portion of positive and negative electrical current, while allowing data and remaining power to continue to flow between the first data cable and the second data cable.

4. The POE tapping device of claim 2, further including a power extraction data coupling circuit between said flow through connection and said bridge circuit, said power extraction data coupling circuit connected to said flow through connection to tap positive and negative electrical current from said flow through connection that is flowing from at least two conductors of the first data cable that also carry data to at least two conductors of the second data cable, said power extraction data coupling circuit able to extract a portion of positive and negative electrical current, while allowing data and remaining power to continue to flow between the first data cable and the second data cable, said power extraction data coupling circuit connected to a rectifying bridge of said bridge circuit for each set of the first data cable that carries data and positive and negative current and is to be tapped.

5. The POE tapping device of claim 3, where in said power removal data coupling circuit is a magnetics circuit.

6. The POE tapping device of claim 4, where in said power removal data coupling circuit is a magnetics circuit.

7. The POE tapping device of claim 1, further including a DC reduction converter, said DC reduction converter connected between said bridge circuit and said a remote accessory connector to reduce the tapped electrical current to the proper voltage for the remote accessory.

8. The POE tapping device of claim 2, further including a DC reduction converter, said DC reduction converter connected between said bridge circuit and said a remote accessory connector to reduce the tapped electrical current to the proper voltage for the remote accessory.

9. The POE tapping device of claim 3, further including a DC reduction converter, said DC reduction converter connected between said bridge circuit and said a remote accessory connector to reduce the tapped electrical current to the proper voltage for the remote accessory.

10. The POE tapping device of claim 4, further including a DC reduction converter, said DC reduction converter connected between said bridge circuit and said a remote accessory connector to reduce the tapped electrical current to the proper voltage for the remote accessory.

11. The POE tapping device of claim 1, further including a threshold detect circuit, said threshold detect circuit connected between said bridge circuit and said a remote accessory connector, said threshold detect circuit including circuitry to prevent the flow of electrical current between said bridge circuit and said remote accessory connector until a threshold voltage is reached.

12. The POE tapping device of claim 2, further including a threshold detect circuit, said threshold detect circuit connected between said bridge circuit and said a remote accessory connector, said threshold detect circuit including circuitry to prevent the flow of electrical current between said bridge circuit and said remote accessory connector until a threshold voltage is reached.

13. The POE tapping device of claim 3, further including a threshold detect circuit, said threshold detect circuit connected between said bridge circuit and said a remote accessory connector, said threshold detect circuit including circuitry to prevent the flow of electrical current between said bridge circuit and said remote accessory connector until a threshold voltage is reached.

14. The POE tapping device of claim 4, further including a threshold detect circuit, said threshold detect circuit connected between said bridge circuit and said a remote accessory connector, said threshold detect circuit including circuitry to prevent the flow of electrical current between said bridge circuit and said remote accessory connector until a threshold voltage is reached.

15. The POE tapping device of claim 11, further including a DC reduction converter, said DC reduction converter connected between said bridge circuit and said a remote accessory connector to reduce the tapped electrical current to the proper voltage for the remote accessory.

16. The POE tapping device of claim 12, further including a DC reduction converter, said DC reduction converter connected between said bridge circuit and said a remote accessory connector to reduce the tapped electrical current to the proper voltage for the remote accessory.

17. The POE tapping device of claim 13, further including a DC reduction converter, said DC reduction converter connected between said bridge circuit and said a remote accessory connector to reduce the tapped electrical current to the proper voltage for the remote accessory.

18. The POE tapping device of claim 14, further including a DC reduction converter, said DC reduction converter connected between said bridge circuit and said a remote accessory connector to reduce the tapped electrical current to the proper voltage for the remote accessory.

19. The POE tapping device of claim 1, further including a surge suppression circuit between said input connector and said output connector.

20. The POE tapping device of claim 1, further including a data connection between said input connector and said output connector to feed data out said input connector or said output connector.

21. The POE tapping device of claim 1, further including a power keying logic circuit connected to a detector that commands said power keying logic circuit, said power keying logic circuit connected to at least one switch to control electrical current to the power device based on commands from said detector.

* * * * *